United States Patent [19]

Bauman et al.

[11] Patent Number: 4,692,470

[45] Date of Patent: Sep. 8, 1987

[54] PROCESS FOR INCORPORATING POWDERS IN VISCOUS FLUIDS

[75] Inventors: Bernard D. Bauman, Coopersburg; Patricia E. Burdick, Whitehall, both of Pa.

[73] Assignee: Air Products and Chemicals, Inc., Allentown, Pa.

[21] Appl. No.: 825,832

[22] Filed: Feb. 4, 1986

[51] Int. Cl.$^4$ ............................................. C08J 9/40
[52] U.S. Cl. .......................................... 521/55; 521/54; 521/88; 521/117; 521/137
[58] Field of Search ..................... 521/54, 55, 137, 88

[56] References Cited

U.S. PATENT DOCUMENTS

| | | |
|---|---|---|
| 3,251,916 | 5/1966 | Newnhans et al. ............ 521/54 |
| 3,256,218 | 6/1966 | Knox ............................... 521/54 |
| 3,300,421 | 1/1967 | Merrimau et al. ............. 521/54 |
| 3,509,079 | 4/1970 | Hyde et al. ..................... 521/54 |
| 3,594,335 | 7/1971 | Schultz et al. .................. 521/54 |
| 3,772,219 | 11/1973 | Schwarz ........................ 521/54 |
| 4,331,726 | 5/1982 | Cleary ........................... 521/54 |
| 4,480,053 | 10/1984 | Sherno ........................... 521/54 |

*Primary Examiner*—Morton Foelak
*Attorney, Agent, or Firm*—Mark L. Rodgers; E. Eugene Innis; James C. Simmons

[57] ABSTRACT

In order to overcome the problems encountered in attempting to mix finely divided organic polymer materials into viscous polyol because of accompanying air entrainment, the polymer material is pretreated with a volatile liquid halocarbon or liquid hydrocarbon in an amount at least sufficient to wet the surfaces of the polymer particles. The halocarbon or hydrocarbon is one preferably otherwise employed as a blowing agent for the preparation of foamed resin polymers such as a polyurethane; particularly methylene chloride or a fluorocarbon (e.g. monofluorotrichloromethane). In accordance with an alternative embodiment the volatile treating liquid may be first mixed with the viscous polyol before addition of the ground material therein.

16 Claims, 4 Drawing Figures

PROCESS FOR INCORPORATING POWDERS IN VISCOUS FLUIDS

TECHNICAL FIELD

The present invention is concerned with the admixture of finely divided polymeric solids into viscous fluids.

BACKGROUND OF THE INVENTION

It has been observed that when certain finely divided or powdery polymeric materials are attempted to be admixed with a viscous liquid, such as with a liquid prepolymeric medium, bubbles are formed because of air entrainment during the mixing. Another major problem caused by entrained air is increased slurry viscosity, which is a limitation to the amount of powder additive which can be employed. As a result pockets may be formed in the finished polymer made from the mixture, leading to the presence of voids and holes. Apparently the molecules of air interfere with the wetting of the powder particles and are not readily disassociated from such particles. The extent of this problem is dependent upon the amount of air trapped during the mixing, the uniformity of the entrapment and the size of the individual bubbles. In order to obtain acceptable performance in a system, this entrained air must be eliminated or controlled, depending upon the nature of the polymeric system involved. For example, the presence of numerous small bubbles uniformly dispersed throughout the polyol slurry precursor of a polyurethane or other polymer foam may be acceptable. It is not acceptable, however, if the bubbles are large and/or localized, which will lead to large holes in the finished foam.

The solutions to the problems presented vary with the polymeric system employed. In the case of thermoplastic polymers, the air is mechanically removed via shear intensive equipment (such as extruders, opposed roller mills, etc.). These thermoplastic polymers generally are already polymerized prior to the addition of the solid material (such as fillers for example) and these have the ability to build up some internal shear of their own to combine with the mechanical shear for driving the air out of the system. Such is the case, for example, in the addition of talc as a filler in polypropylene. Systems of this sort present no real problem.

However, in the case of thermosetting polymers, mixing of solids is generally carried out in the precursor system or otherwise where further polymerization is yet to occur and wherein a different type of less intensive processing equipment is employed. There is but a minimal internal shear generated when the finely divided solid material is added to the liquid polymerizing component rather than to the final polymerized product. The turbulence in such liquid components will usually increase the amount of air incorporated in the liquid. Among problem materials in this category are resin components for the production of phenolic, unsaturated polyester, epoxy and polyurethane resins.

None of the solutions to the indicated problem that have been proposed have been found entirely effective or acceptable. For example, it has been proposed in the case of unsaturated polyesters, to incorporate certain additives to decrease the viscosity buildup due to entrapped air. When the polymer system is pressed at the lower viscosity most of the air can be forced out of the resin system before completion of cure. This approach attempts to minimize the result rather than eliminate the cause, and in the interim increases the expense. Only certain solid materials can be incorporated into this type of resin system, and the proposed solution is limited to the special problems of this particular resin system.

A number of different techniques have been employed in polyurethane resin systems but none of these have been found to solve the bubble formation problem. Agitation of the components, for example, is minimized to keep down the amount of additional air introduced by agitation. Then the samples are placed in a vacuum over to dry and draw off some of the incorporated air. However, this approach is very time consuming and requires vacuum equipment not generally used by this industry.

SUMMARY OF THE INVENTION

In accordance with the present invention the problems experienced in the attempted addition of finely divided or powdery polymeric materials to viscous fluids, such as a polymeric system, are overcome or attenuated, by pretreating the surface of such materials with a non-viscous liquid of low surface energy. By such pretreatment a solvating layer is formed around the particles, replacing much of the air, thus easing incorporation of the solid into the polymeric system by reducing the time required to wet the solid particles and release the entrapped air. The pretreating agent employed should be one that is chemically and process compatible with the polymeric system into which it will be admixed. Preferably, when possible, the treating agent is one that is part of the existing formulation for the polymeric resin and is utilized in an amount substantially within the limits of its usual use level in the formulation. Thus, the exact chemical composition of the treating agent will depend upon the particular polymeric system in which it is to be employed. Thus, in a system for production of polyurethane foam, the treating agent may be preferably a halocarbon.

DETAIL DESCRIPTION OF THE INVENTION

Figure 1:
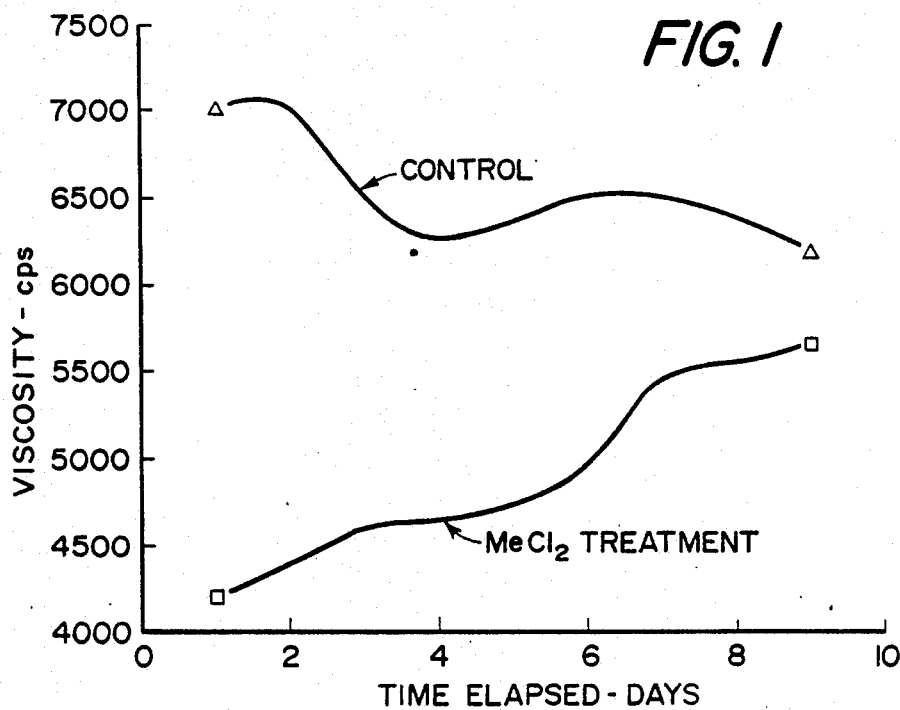
FIG. 1 is a series of graphs showing viscosity changes with time of a product produced in accordance with the invention as compared to an untreated control.

In one small scale approach to practice of the invention, the finely divided solid material to be incorporated into the viscous liquid was initially weighed out and placed in a glass beaker. The amount of pretreating agent employed was that sufficient to wet the surfaces of all the particles and more than could be tolerated in the formulation. The treating liquid was poured over the solids and the slurry stirred for at least three minutes to insure maximum exposure of the solid particles to the lower viscosity treating liquid. The slurry was then filtered to remove excess treating liquid. The treated solid was weighed and the amount of residual treating agent remaining thereon calculated. The agent on the surfaces of the solid particles was permitted to evaporate until a predetermined level of residual liquid was reached. The obtained surface-treated solids can be used directly for admixture into a viscous polymeric liquid system or stored for later use. The amount of treating agent on the solid particles should not be permitted to evaporate completely, in which event it would behave as if it had never been treated.

In scaling up the foregoing small scale approach for practice of the invention, in accordance with one embodiment, the solid material is combined with the liquid treating agent in a slurry tank and the contents mechanically agitated to insure complete surface saturation of the particles. The excess liquid may be drained off or evaporated. If the excess is within the use limitations of the formulation, removal of the excess liquid need not be practiced. However, if the treating liquid is one that evaporates easily, the treated solids should be kept in a closed container until ready to be used.

In an alternative procedure, the mixing of the solids with the treating liquid may be carried out in a tumbler wherein the liquid is sprayed on the particles as these tumble by. In this procedure excess treating liquid must be controlled because it is important that the free flow of the solids be maintained to a sufficient degree to tumble properly. Here also, the treated solids should be stored in a closed container.

In either of the foregoing mixing methods the amount of liquid treating agent required is determined by its viscosity and the amount of solid material being prepared. There must be sufficient treating agent present to adequately cover all exposed surfaces of the solid particles. The effectiveness of the described approach to deaeration is dependent directly upon the efficiency of exposure of the solid particles to the treating agent.

EXAMPLE 1

Polyurethane foam scrap was cryogenically ground to yield a fine solid material. The finely divided polyurethane was pretreated with excess methylene chloride ($MeCl_2$) using 9.2 milliliters of $MeCl_2$ per gram of solids, and stirring for three minutes, following which the slurry was filtered gravimetrically. The wet solid particles were laid flat and the residual $MeCl_2$ allowed to evaporate in a hood until the particles contained 0.25 parts by weight of $MeCl_2$ per part of polyurethane.

The pretreated particles were incorporated in polyol providing a slurry for production of polyurethane foam. Thus, 8 grams of the pretreated ground polyurethane scrap and 2 grams of methylene chloride, were stirred into 80 grams of Voranol 3010.

The methylene chloride selected as the solvating agent in the above example is a known blowing agent included in polyurethane foam formulations and could be added to the polyol without causing any premature reactions and without incurring added cost. Other known halocarbon blowing agents that could be employed for pretreatment of ground polyurethane scrap include the usual fluorocarbon types, such as trichloromonofluoro methane (R-11) used in some of the runs reported hereinbelow, as well as trifluoromethane, trichlorofluoromethane, trichlorofluoroethane, dichlorodifluoromethane, and various commercial blends of fluorocarbon blowing agents.

Voranol 3010 is an ethylene oxide/propylene oxide copolymer having a molecular weight of about 3800 and a hydroxyl number of 56 mg KOH/g.

EXAMPLE 2

A series of runs were made for the incorporation of cryogenically ground polyurethane foam scrap (80% 40 mesh and finer) into a typical polyetherpolyol (10 parts scrap per hundred parts solid) employed in polyurethane foam formulations.

(I) The ground scrap was treated with excess methylene chloride or with excess trichloromonofluoromethane (R-11) and hand stirred for three minutes. The mixtures were then filtered to remove excess treating agent and the retained solids laid out flat on the filter paper to permit further evaporation of the treating agent. When a predetermined amount of liquid residue remained on the particles, these pretreated particles were admixed with the polyol and the viscosity measured.

(II) In another set of runs the $MeCl_2$ or R-11 was directly admixed with the polyol and the ground foam added to the liquid polyol medium to the desired concentration employed in the other samples.

(III) As a control the same polyol was mixed with untreated ground foam (10 php) and viscosity readings taken.

Viscosity determination of each of the samples was carried out using a Brookfield viscometer. The sample slurries were mixed in a glass jar and measured at a constant shear rate. The disc spindle was submerged into the slurry using a guide to center the spindle in each run, so that the distance from the walls of the jar remained the same and reproducible results were obtained.

The Brookfield viscosimeter is recognized as a good instrument for measuring trends or observing relative differences in a series, although the "exact" viscosity measured may show some variation from one set evaluation to another. Such observed variation may likely be due to differences in the ground foam sample since it is composed of a scrap composite. It was observed, however, that the various samples consistently behaved in the same manner when compared to the control.

FIG. 1 of the accompanying drawings illustrates the viscosity trend over a period of ten days. The viscosity of the control decreases initially as the air gradually dissipates, particles are wetted and caused to swell. With the methylene chloride treated samples (I above) which contained a final concentration of 2.5 php methylene chloride, it will be observed that the curve starts out at a very low viscosity and rises steadily.

The viscosity behavior beyond the first three days is of no practical use since the most a prepared slurry would sit would be over a weekend during a normal operation. The graphical illustration clearly shows that the methylene chloride treatment dramatically reduces the viscosity of the slurry. The viscosity percent differences over the first three days were averaged and are reported in Table 1. Numerically, the methylene chloride treated sample has a 35% lower viscosity than the control. Accordingly the treatment with methylene chloride is three times as effecttive and provides greater leeway for increasing the use level of particulate additives.

Figure 2:
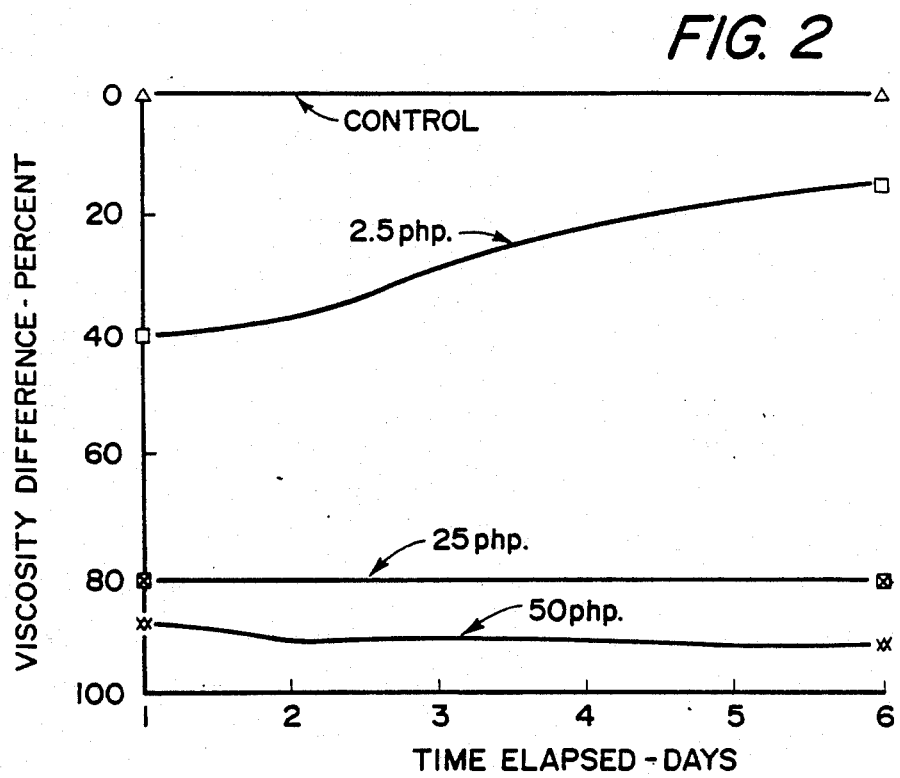
FIG. 2 is a series of graphs showing the relative effect of amount of treating agent employed on the viscosity differential over untreated products.

The curves on FIG. 2 depict the behavior of $MeCl_2$ at several treatment levels as compared to that of the untreated control. When all of the $MeCl_2$ was permitted to evaporate, the curve matched that of the control curve. As the level of residual $MeCl_2$ increases, the viscosity differences steadily get greater. At the higher levels (20 php and 50 php $MeCl_2$), the $MeCl_2$ diluted the polyol so much that the additional 10 php ground foam scrap appeared to have little effect on viscosity. However, these levels are beyond those normally employed in a polyurethane foam formulation. The maximum level of blowing agent typically employed in an organic blown foam is in the order of about 20 php and this applies even more so in the case of fluorocarbon blowing agents such as R-11. Processing problems are encountered when using $MeCl_2$ at high levels so it is more commonly employed at levels below about 7 php.

Figure 3:
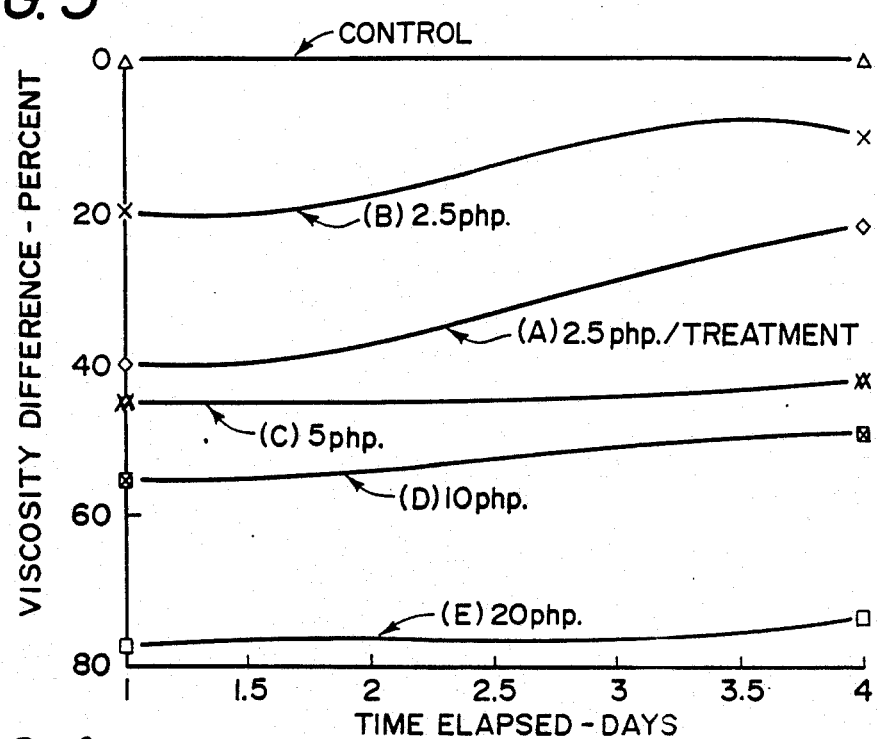
FIGS. 3 and 4 each shows a series of graphs comparing different embodiments of the invention as to the viscosity behavior of the products over an elapsed time period.

The curves in FIG. 3 depict the behavior of various premix samples (Series II) and a pretreated sample (Series I). As explained above, the treated samples basically were prepared by combining the $MeCl_2$ or R-11 with the ground foam first and then incorporating the thus treated sample into the polyol. In the case of the premix samples of $MeCl_2$ or R-11 is first admixed with the polyol and the ground foam added to the liquid medium. In the samples depicted in FIG. 3, $MeCl_2$ was employed as the treating agent. The 2.5 php treated sample (Curve A) was more effective at reducing viscosity than the 2.5 php premixed sample (Curve B). As seen in Table 1 the premix sample is 15% lower in viscosity than the control, while the viscosity of the treated sample is 35% lower than that of the control. The treatment appears to double the effectiveness of the $MeCl_2$ over the first three days. Interestingly, curves A and B of FIG. 3 are very similar in slope. As the $MeCl_2$ level increases, each of the curves flattens out. The premix technique does work even though it is not as effective as the treatment procedure (Series I). At the higher levels of treating agent, particularly when volatile halogenated organic blowing agents are employed as such treating agents, the choice of procedural technique may be optional. The premix approach does obtain some extra convenience and cost advantages over the treatment approach, in that it does not entail an extra processing step.

Curves C, D and E of FIG. 3 illustrate the effect of increasing the amount of $MeCl_2$ employed.

Figure 4:
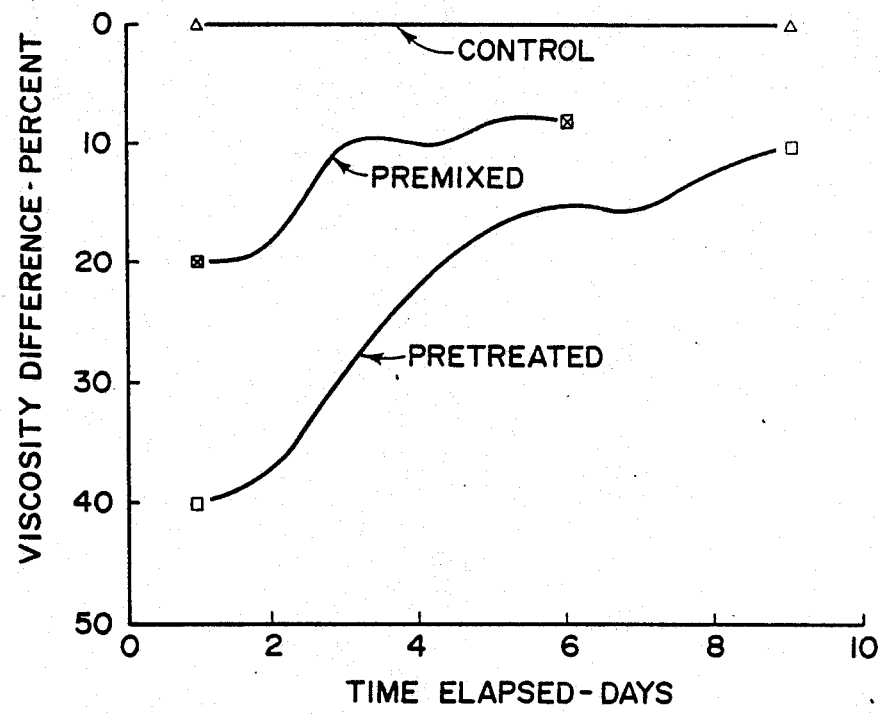

FIG. 4 summarizes the effectiveness of premix and pretreated samples. The curves in this figure demonstrate that the pretreated sample is twice as effective as the premix sample.

TABLE 1

| PERCENT DIFFERENCES IN VISCOSITY (First 3 Day Average) | |
|---|---|
| SAMPLE COMPOSITION (All Contained 10 php ground foam) | Average Amount (%) Below Control |
| 1. Control | — |
| 2. 20 php MeCl$_2$ (premixed) | 66 |
| 3. 10 php MeCl$_2$ (premixed) | 43 |
| 4. 5 php MeCl$_2$ (premixed) | 34 |
| 5. 2.5 php MeCl$_2$ (premixed) | 15 |
| 6. 2.5 php MeCl$_2$ (pretreat) | 35 |
| 7. 2.5 php R-11 (pretreat) | 37 |

It will be apparent from the foregoing reported results that each of the described novel approaches employing a volatile organic blowing agent as solvating agent for incorporation of finely divided polymeric materials into the polyol employed in formulations for polyurethane foam products provides increased leeway in the viscosity of the slurry. It is to be expected that the minimum amount of such solvating agent required to sufficiently wet the foam particles will increase as the quantity of ground foam is increased. However, as long as the amount of blowing agent stays within the constraints of the polyurethane foam formulation, the amount employed, either in the treatment technique or in the premixing approach, should present no problem.

While the invention has been illustrated by the examples above employing ground polyurethane scrap for incorporation into polyols for production of blown polyurethane foams, the principles of the invention are not limited thereto. The invention may be advantageously utilized for the incorporation of other finely divided organic polymeric solid materials into viscous polyols employed in formulations for production of blown polyurethane or other polymer resins. Illustrative examples of incorporation of other polymeric materials into viscous polyols are set out below.

EXAMPLE 3

(a) Polypropylene bottle and film scrap were ground to a size range of 94% through 20 mesh, 75% through 30 mesh, and 15% through 60 mesh.

(b) Part of the ground polypropylene from (a) above was treated with $MeCl_2$ in an amount providing 30% $MeCl_2$ by weight of polypropylene.

Each of the treated and untreated samples from (a) and (b) above was separately incorporated into the polyol (Voranol 3010) at a level of 10 php and the viscosity of the solids-containing polyol was determined after standing for respectively one, two and three days. The results are reported in Table 2.

EXAMPLES 4 AND 5

The same procedure as in Example 3 was followed wherein the ground solid material was: (a) polyethylene terephthalate scrap bottles ground to 90% through 20 mesh and 69% through 30 mesh; (b) tire rubber scrap ground to 40 mesh.

Part of each of the above compositions (a and b) was left untreated and another part of each pretreated with 30% methylene chloride. Each of the MeCl$_2$-treated and the untreated ground materials was separately incorporated in Voranol at the 10 php level. The obtained viscosity measurements are reported in Table 2.

Apparently the wetting agent employed in treating the finely divided polymeric material does not rely for effectiveness on mere reduction of the viscosity of the polyol. The viscosity of the ethylene oxide/propylene oxide polyol employed (Voranol 3010) is about 475–480 cps. The addition thereto of methylene chloride in the amounts disclosed in the examples decreases the viscoisty of the mixture by only about 20 cps. The data in Table 2 clearly demonstrates that the $MeCl_2$ treatment has a greater impact than mere reduction in the viscosity of the polyol.

TABLE 2

| | VISCOSITY (CPS) | | |
|---|---|---|---|
| | Day 1 | Day 2 | Day 3 |
| 10 php untreated PP/polyol | 840 | 980 | 900 |
| 10 php MeCl$_2$ treated PP/polyol | 620 | 680 | 720 |
| 10 php untreated PET/polyol | 1760 | 1760 | 1360 |
| 10 php MeCl$_2$ treated PET/polyol | 1160 | 1120 | 1040 |
| 10 php untreated tire rubber/polyol | 660 | 600 | 580 |
| 10 php MeCl$_2$ treated tire rubber/ polyol | 460 | 460 | 444 |

PP = polypropylene
PET = polyethylene terephthalate

While in the examples set out the blowing agent employed for wetting the finely divided polymeric materal is either methylene chloride or a fluorocarbon, it will be understood that other volatile liquids of the type used as blowing agents may be employed, such as volatile $C_5$ and $C_6$ hydrocarbons (e.g. n-pentane or n-hexane). The choice of such wetting agents will depend upon the particular polymeric particles desired to be incorporated into the resin formulation.

What is claimed:

1. The method of facilitating incorporation of finely divided polymeric solid particles into viscous liquids which comprises the use of a wetting agent effective in displacing adsorbed air from the surface, crevices and pores of such particles, said wetting agent being applied by pretreatment of the solid particles therewith prior to their admixture with the viscous liquid or by direct admixture with the viscous liquid prior to admixture of the solid particles into said viscous liquid, said wetting agent being a volatile organic blowing agent.

2. The method as defined in claim 1 wherein said viscous liquid is a polyol and said finely divided solid is ground polyurethane.

3. The method as defined in claim 2 wherein said wetting agent is methylene chloride.

4. The method as defined in claim 3 wherein said wetting agent is applied by mixing with said ground polyurethane particles prior to their incorporation with the polyol, said agent being in an amount at least sufficient to wet the surfaces of said particles.

5. The method as defined in claim 3 wherein said wetting agent is applied by mixing with the viscous liquid prior to incorporation of the ground polyurethane particles into said liquid.

6. The method as defined in claim 2 wherein said wetting agent is a fluorocarbon.

7. The method as defined in claim 6 wherein said fluorocarbon is monofluorotrichloromethane.

8. The method as defined in claim 7 wherein said fluorocarbon is applied by mixing with said polyurethane particles prior to their incorporation with the polyol, said fluorocarbon being in an amount at least sufficient to wet the surfaces of said particles.

9. The method as defined in claim 1 wherein said wetting agent is a halocarbon.

10. The method as defined in claim 1 wherein said wetting agent is methylene chloride.

11. The method as defined in claim 1 wherein said wetting agent is a fluorocarbon.

12. The method as defined in claim 1 wherein said wetting agent is monofluorotrichloromethane.

13. The method as defined in claim 1 wherein said wetting agent is a volatile $C_5$ or $C_6$ hydrocarbon.

14. The method as defined in claim 1 wherein said finely divided polymeric particles consist essentially of polypropylene.

15. The method as defined in claim 1 wherein said finely divided polymeric particles consist essentially of polyethylene terephthalate.

16. The method as defined in claim 1 wherein said finely divided polymeric particles consist essentially of ground tire rubber.

* * * * *